Figure 1:
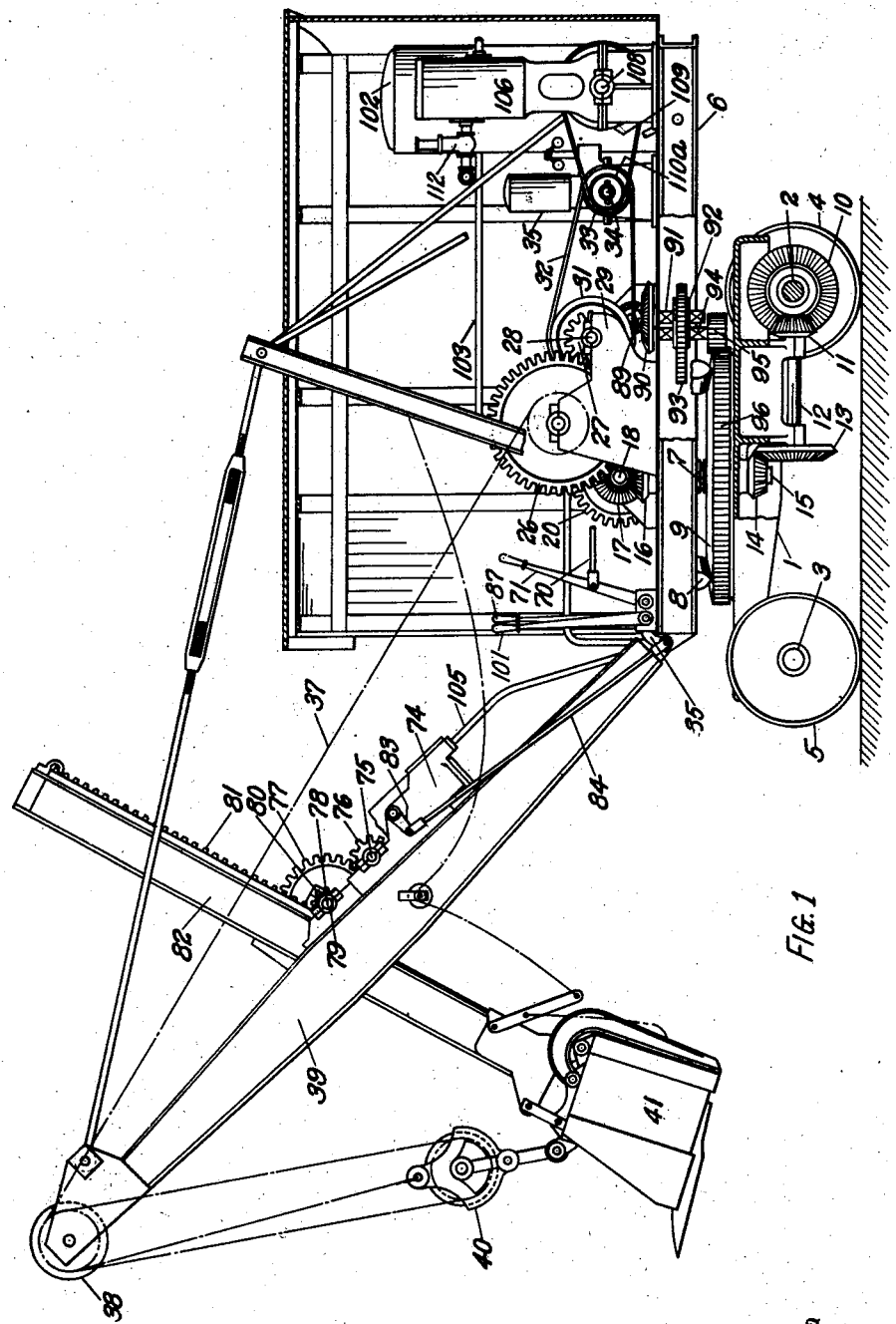

June 23, 1925. 1,542,981

E. J. ARMSTRONG

POWER EXCAVATING MACHINE AND METHOD OF ACTUATING THE SAME

Filed Feb. 26, 1923   4 Sheets-Sheet 4

Inventor
Edwin J. Armstrong

By
Attorneys

Patented June 23, 1925.

1,542,981

UNITED STATES PATENT OFFICE.

EDWIN J. ARMSTRONG, OF ERIE, PENNSYLVANIA, ASSIGNOR, BY DIRECT AND MESNE ASSIGNMENTS, TO ERIE STEAM SHOVEL COMPANY, OF ERIE, PENNSYLVANIA, A CORPORATION OF PENNSYLVANIA.

POWER EXCAVATING MACHINE AND METHOD OF ACTUATING THE SAME.

Application filed February 26, 1923. Serial No. 621,336.

*To all whom it may concern:*

Be it known that I, EDWIN J. ARMSTRONG, a citizen of the United States, residing at Erie, in the county of Erie, and State of Pennsylvania, have invented new and useful Improvements in Power Excavating Machines and Methods of Actuating the Same, of which the following is a specification.

Power excavating devices, particularly shovels and cranes are operated very largely by steam engines. While some of these devices have been actuated by other types of motors it has been difficult to get satisfactory results from such motors due to the failure of such motors to give the proper control and acceleration to the motors used as for instance the turning engine and the crowding engine. These engines do not require a great amount of power in the total and are used but intermittently, but in order to get rapid operation of the machine, they must have great acceleration and be subject to very nice control. Fluid actuated engines satisfy this requirement perfectly. In the present invention I utilize preferably a a different motor than the fluid actuated motor, preferably an explosive engine and drive the hoist directly from this engine inasmuch as the hoist ordinarily involves a longer running action than the other parts and it lends itself to the direct action from such motor with a fair degree of efficiency. It will be understood that the hoisting effort, the crowding effort, and turning effort of these machines operate successively and are seldom all working at least at the maximum together. In carrying out my invention I preferably use, as before stated, an explosive engine for operating the hoisting mechanism but whatever motor is used I prefer to compress a fluid by means of a compressor driven by the motor for actuating the crowding engine, or the turning engine and in order to reduce the peak load on the motor I prefer to provide the motor with means which automatically unloads the compressor or relieves the engine of the compressor load during the interval when the engine is hoisting, or when the engine is laboring to an extent that tends to reduce this speed. In this way the engine runs at practically full power all the time thus giving better and more economical results so far as the engine is concerned. Where power sufficient to take care of the hoisting is provided this same power in the interval in which the hoisting effort is small, or has entirely ceased is continued in storing the energy for operating the crowding or turning engines. Features and details of the invention will appear from the specification and claims.

The apparatus forming the subject matter of the invention and by which the method may be carried out is illustrated in the accompanying drawings as follows:—

Fig. 1 shows a side elevation of a power shovel.

Figure 2:
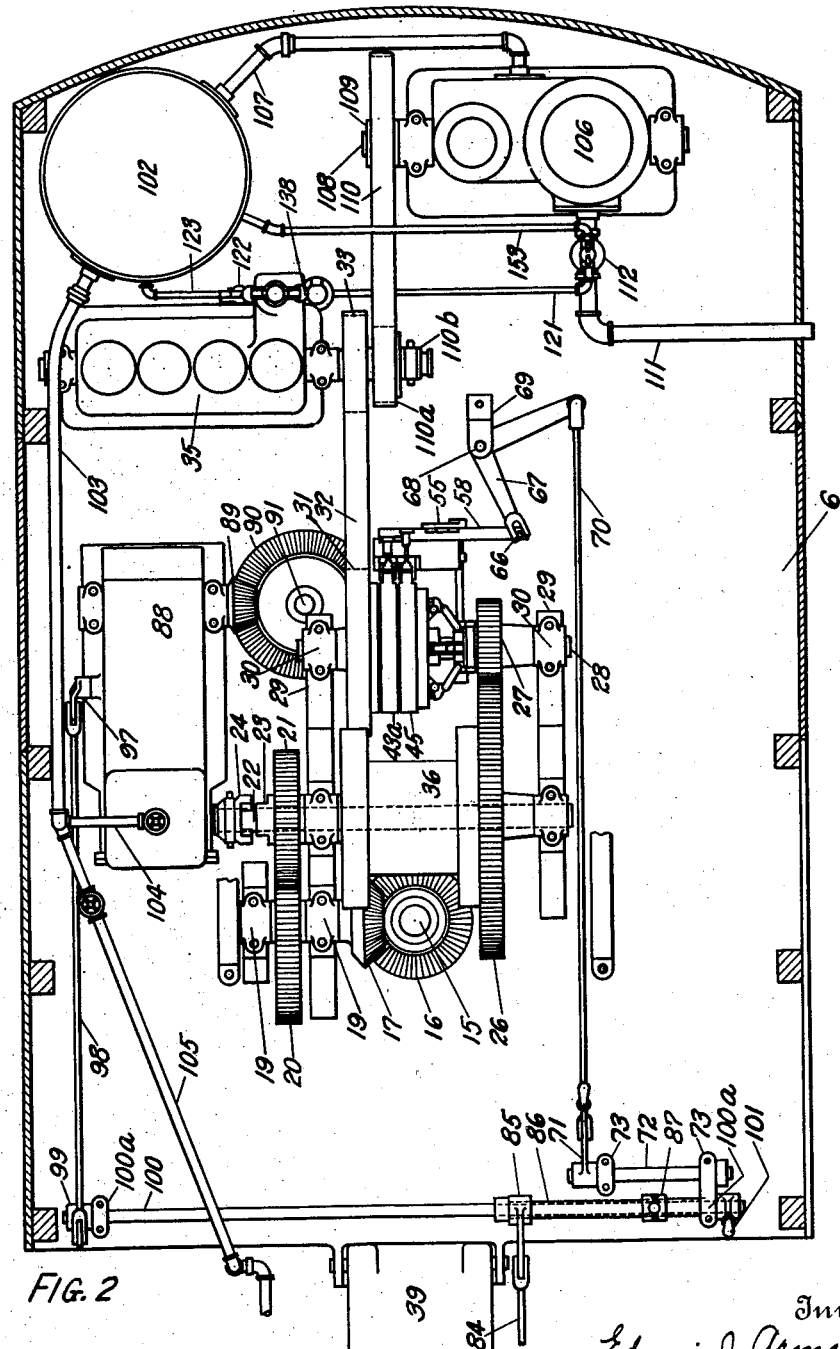

Fig. 2 a plan view of the operating platform.

Figure 3:
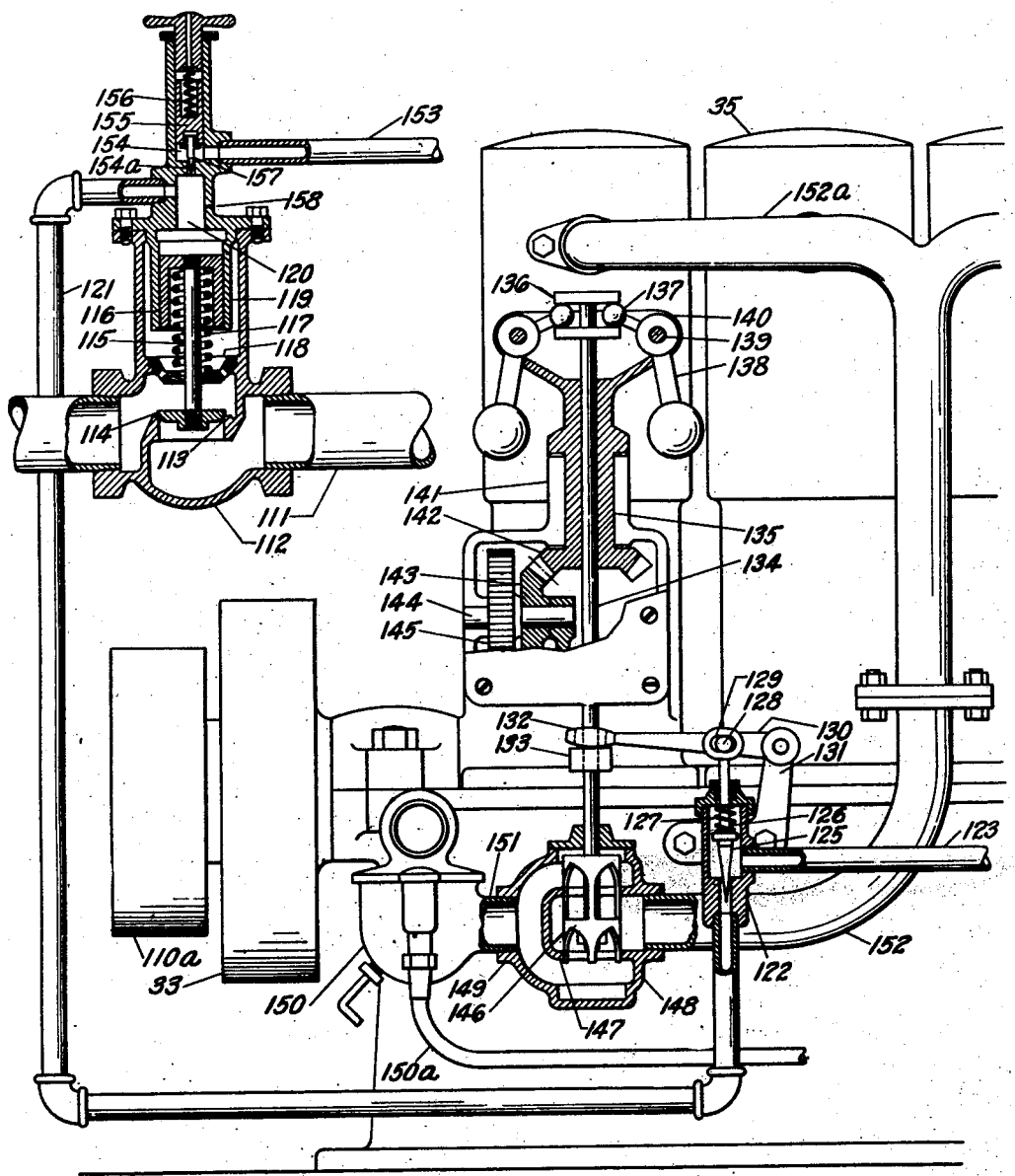

Fig. 3 a side elevation of the controlling devices for the engine and compressor.

Figure 4:
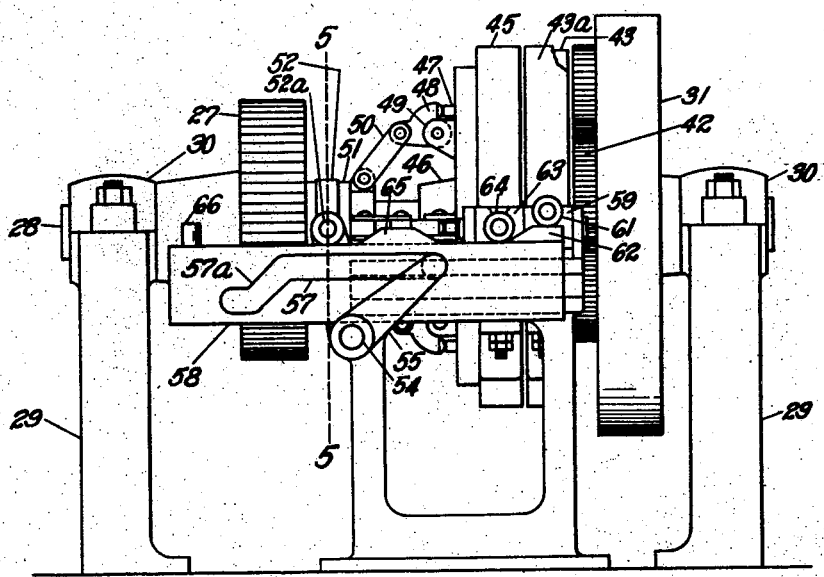

Fig. 4 a side elevation of a transmission mechanism between the engine and hoist.

Figure 5:
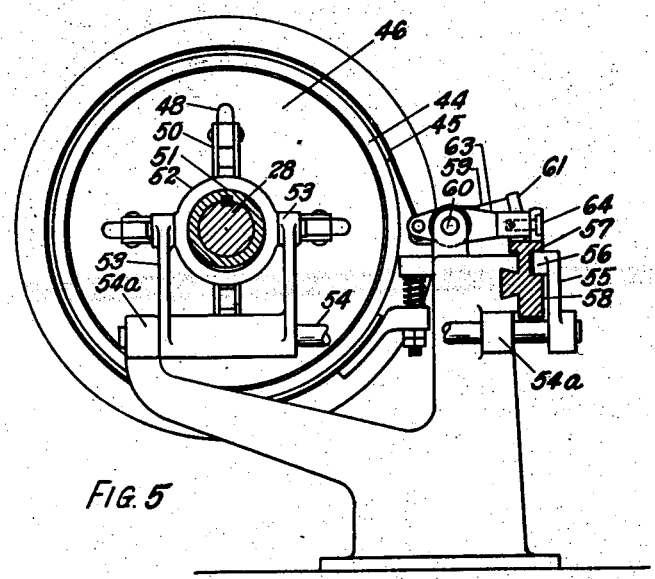

Fig. 5 a section on the line 5—5 in Fig. 4.

1 marks the frame, 2 the rear driving axle, 3 the steering axle, 4 the drive wheels, 5 the wheels on the steering axle, 6 the swinging platform, 7 a pivotal mounting of the platform, 8 rollers carrying the platform, 9 a circular track on which the rollers operate, 10 a driving gear on the drive shaft 2, 11 a pinion meshing with the gear 10, 12 a shaft on which the gear 11 is fixed, 13 a beveled gear on the shaft 12 meshing with a pinion 14, 15 an upright shaft having its axis coincident with the pivotal mounting of the frame, 16 a beveled gear on the upper end of the shaft 15, 17 a gear meshing with the gear 16, 18 a shaft on which the gear 17 is mounted, 19—19 bearings in which the shaft 18 is journaled, 20 a gear fixed on the shaft 18, 21 a gear meshing with the gear 20, said gear being journaled on a drum shaft 22, 23 and 24 clutch elements adapted to lock the gear 21 with the shaft 22, and 26 a drum gear on the opposite end of the shaft 22. These parts are, or may be of ordinary construction.

The gear 26 is driven by a gear 27. The gear 27 is mounted on a shaft 28, the shaft being carried by bearings 30 on posts 29 extending up from the frame. A drive pulley 31 is journaled on the shaft 28 and is driven by a belt 32 running from a power pulley 33 on the engine shaft 34 extending from an internal combustion engine 35. The usual hoisting drum 36 is mounted on the shaft 22 and driven by the gear 26. A hoisting line 37 operates from the drum 36 over the sheaves 38 at the end of a boom 39. The line extends through a block 40 which block is secured to a dipper 41.

The power is transmitted from the pulley 31 to the gear 27 through a planetary gear transmission of ordinary type. This has the planetary gears 42 and these are controlled by a reversing drum 43 which is locked in the usual manner by a band 43ª. The slow speed ahead is controlled by a drum 44 when locked by a band 45. The direct speed is accomplished when the drum 44 is locked by a clutch 46 with the shaft 28. The clutch 46 is operated through thrust pins 47, a bell crank lever 48 pivoted on brackets 49 extending from the clutch carrier. Toggle levers 50 extend from the sliding sleeve 51. An operating collar 52 is journaled on the sleeve 51 and has the usual trunnions 52ª to which lever arms 53 extend. The lever arms are mounted on a shaft 54 and the shaft is journaled in bearings 54ª on the frame. A lever 55 is fixed on the shaft 54 and has a stud 56 which extends into a controlling slot 57, the controlling slot being arranged in a sliding control block 58. The band 43ª is operated by a lever 59, this lever being pivoted on a pin 60. The inner end of the lever is connected to the band 43ª and a roller 61 at its outer end is in the path of a cam 62 on the sliding block 58. When this cam is under the roller the band 43ª locks the drum 43 and sets the planetary gear in the reverse in the usual manner. A similar lever 63 is journaled on a pin connected with the band 45. The outer end of the lever 63 is provided with a roller 64 which is in the path of a cam 65 on the block 58. When the block is moved to a position bringing the cam 65 under the roller 64 the cam 65 locks the drum 44 and sets the planetary gear to slow speed ahead. The slot 57 is continued through a cam 57ª and when the sliding block is advanced sufficiently to carry the stud 56 into the portion 57ª of the slot 57 the lever 55 is rocked thus through the chain of mechanism heretofore described setting the friction clutch 46 and locking the shaft 28 with the drive pulley 31. With this mechanism, therefore, when the shovel is running under its power, the clutch elements 23 and 24 being set, the machine may be run forward two speeds and reversed through this mechanism. Further the hoisting drum may be handled with the two speeds if desired.

The sliding block is provided with a stud 66 which is engaged by one arm of a bell crank lever 67. The bell crank lever is pivotally mounted on a pin 68 on a bracket 69 on the frame. A link 70 extends from the bell crank lever 67 to a controlling lever 71. The controlling lever is mounted on a shaft 72 carried by bearings 73 in position to be handled by an operator standing in the usual position on the platform. With this lever, therefore, the different speeds and reverse may be controlled and the transmission released if desired.

A crowding engine 74 is mounted on the boom. A crank shaft 75 of the crowding engine drives a gear 76 which gear meshes with a gear 77. The gear 77 is mounted on a shaft 78. The shaft 78 is mounted in a bearing 79 on the boom. A gear 80 is also fixed on the shaft 78 and this meshes with a rack 81 on a dipper stick 82. A controlling valve lever 83 operates on the crowding engine in the usual manner and a link 84 connects the lever 83 with a lever 85. The lever 85 extends from a sleeve 86 and a controlling lever 87 is fixed on the sleeve 86 in position to be handled by the operator from his usual position on the platform. The details of the crowding engine are, or may be, of usual construction, the engine being fluid pressure actuated and in this instance is actuated by air pressure. A turning engine 88 is mounted on the platform. A pinion 89 is mounted on the crank shaft of the turning engine and meshes with a beveled gear 90. The beveled gear 90 is mounted on a vertical shaft 91. A gear 92 is fixed on the shaft 91 and meshes with a gear 93. The gear 93 is mounted on a vertical shaft 94. A gear 95 is fixed on the shaft 94 and meshes with a gear 96 surrounding the track 9. This train of gearing swings the platform in the usual manner of machines of this type. A controlling lever 97 controls the fluid pressure engine 88 in the usual manner. A link 98 extends from the lever 97 to a rock arm 99. The rock arm 99 is fixed on a shaft 100. The shaft is mounted in bearings 100ª on the platform. An operating lever 101 is fixed on the shaft 100 in position to be handled by an operator from his usual position on the platform.

An air receiver 102 is mounted on the platform and a supply pipe 103 extends from the receiver. A branch pipe 104 leads to the fluid pressure actuated turning engine and a pipe 105 leads from the pipe 103 to the fluid pressure actuated crowding engine 74. An air compressor 106 is mounted on the platform and has its discharge pipe 107 leading from the compressor to the receiver 102. A pulley 109 is mounted on the driving shaft 108 of the compressor and a drive belt 110 leads from the pulley 109 to a pulley 110ª on the engine shaft 34. A clutch 110ᵇ is provided by means of which the pulley may be set and released from the shaft.

In order to control the engine and utilize the intervals in which it is relieved from the peak load of the hoist in compressing air for the crowding and turning engines I have provided a mechanism which is illustrated in Fig. 3. The compressor is provided with an inlet pipe 111 and this is controlled by an unloading valve 112. The unloading valve has the usual valve seat 113 on which operates the unloading valve 114. A stem 115 leads from the valve 114 to a plunger 116. A spring 117 is arranged around the stem 115 and is seated on a perforated disc 118. The plunger 116 is mounted in a cylinder 119. The cylinder is in communication with a chamber 120 and a pipe 121 leads from this chamber to a pilot valve 122. The pilot valve is provided with a needle valve shaped element 125 and this is provided with a stem 126. A spring 127 tends to close the valve. A trunnion 128 is arranged at the upper end of the stem 126 and extends into a slot 129 on a lever 130. The lever 130 is pivoted on a bracket 131 and has a forked end 132 which rests on a button 133. The button is mounted on a governor stem 134. The stem extends through a carrier 135 and is provided with the usual spool 136 at its upper end into which the ends 137 of the weighted levers 138 extend. The weighted levers are pivoted on pins 139 on a head 140 of the carrier 135. The carrier 135 is journaled in the governor frame 141 and has a beveled gear 142 arranged at its lower end. A beveled gear 143 is fixed on a shaft 144 and is driven by a gear 145. The gear 145 is driven from a crank shaft of the engine so that the governor is subjected to the engine speed.

When the engine is slowed slightly by the effort of hoisting gravity operating on the levers preponderates over centrifugal force and the weighted levers drop lifting the stem 134 and with it the lever 130. The effect of this is to open the valve 122. The pipe 123 leads to the valve from the receiver so that as the valve opens air is turned into the chamber 120 and to the cylinder 119 and operates on the piston 116 to close the unloading valve 112. The effect of this is to cut off the intake to the compressor and thus unloads the compressor in the usual manner so that during the hoisting effort, or at least the time that the engine is carrying the peak load the compressor is unloaded and the engine thus relieved of this part of the load delivers its entire energy to the hoisting drum.

I prefer to utilize the same governor as a matter of control of the hoisting engine and have, therefore, provided a governor valve of usual type 146 on the stem 134. This valve operates in the usual diaphragm 147, the diaphragm being arranged in a body 148, the body having an inlet end 149 and connected with a carburetor 150 by means of a pipe 151. The carburetor is connected with a fuel supply through a pipe 150ª and a pipe 152 leads from the governor valve to a manifold 152ª of the engine. While the governor operates as a safety device and prevents the running away of the engine and controls the engine to an approximately uniform speed there is, of course, the slight falling off of speed sufficient to actuate the governor which we have heretofore described and which automatically unloads the compressor.

In the operation of the machine generally the operator drops the shovel, crowds it into the work with the crowding engine, at the same time hoisting it to some extent, it being understood that while the unloader cuts off the compressor during the hoisting operation the receiver has ample supply for the crowding engine in a single or even a series of operations. The hoisting operation is then accomplished combining this to some extent with the action of the hoisting engine to locate the boom and the shovel is swung in the usual manner. It will be seen therefore, that the intervals between the hoisting efforts are utilized by the engine in storing up the energy for the crowding and turning engines and, therefore, an approximately constant load is maintained on the engine and thus the shovel may operate very economically and very rapidly and further the shovel is relieved of the offensive smoke and conditions which are incident to the use of steam.

While I have shown an explosive engine as the primary power of the shovel in the broader phases of my invention I do not wish to be limited to this type of engine.

I prefer to utilize the unloader for unloading the compressor when the receiver reaches a pre-determined pressure. In carrying out this feature I connect the chamber 120 by a passage 154ª with a cylinder 154. A piston 155 operates in this cylinder and is crowded forward by a spring 156. A valve 157 is carried by the piston 155 and closes the passage 154ª when the pressure in the cylinder 154 is below the pre-determined pressure. The cylinder is connected with the receiver through the pipe 153. When the receiver pressure rises above the pre-determined pressure, this pressure, being communicated through the pipe 153 to the cylinder 154, acts on the piston 155 and opens the valve, thus delivering air under pressure to the piston 119 and closing the unloader valve and thus unloading the compressor. In order to exhaust the air from the chamber 120 I provide a small vent 158.

What I claim as new is:—

1. In a machine, the combination of a plurality of instrumentalities having intermittent and successive operation; a primary motor operating directly on one of said instrumentalities; a secondary motor operating on the second of said instrumentalities; an energy storing means supplied from the primary motor and supplying energy to the secondary motor; and devices for relieving the primary motor from the effort of delivering energy to the energy storing means during a peak load on the instrumentality actuated directly from the primary motor.

2. In a machine, the combination of two instrumentalities operating intermittently and successively; a primary motor directly actuating one of said instrumentalities; a fluid actuated secondary motor actuating the other of said instrumentalities; a compressor driven by the primary motor and compressing fluid for actuating the secondary motor; and means for relieving the primary motor of the load of the compressor during the peak load on the instrumentality actuated directly from the primary motor.

3. In a power excavating machine, the combination of a digging implement; a primary motor operating directly on said digging instrument; a secondary motor operating on said implement; energy storing means actuated by the primary motor and delivering energy to the secondary motor; and devices relieving the primary motor of the load of delivering energy to the energy storing means while delivering its peak load directly to the implement.

4. In a power excavating machine, the combination of a digging implement; a primary motor acting directly on the implement; a fluid pressure actuated secondary motor acting on the implement; a compressor compressing fluid for actuating the secondary motor driven by the primary motor; and devices relieving the primary motor of the load of the compressor while delivering the peak load directly to the implement.

5. In a power excavating machine, the combination of a digging implement; a hoisting device for the implement; a primary motor operating directly on the hoisting device; a secondary motor acting on the implement; an energy storing means supplied from the primary motor and supplying energy to the secondary motor; and means for relieving the primary motor of the load of supplying energy to the energy storing means while subjected to the peak load of the hoisting device.

6. In a power excavating machine, the combination of a digging implement; a hoisting device acting on the implement; a primary motor driving the hoisting device; a secondary fluid pressure actuated motor acting on the implement; a compressor driven by the primary motor and supplying fluid for the secondary motor; and means for relieving the primary motor of the load of the compressor while subjected to the peak load of the hoisting device.

7. In a machine, the combination of a plurality of instrumentalities having intermittent and successive operation; an internal combustion engine acting as a primary motor operating directly on one of said instrumentalities; a secondary motor operating on the second of said instrumentalities; an energy storing means supplied from the primary motor and supplying energy to the secondary motor; and devices for relieving the primary motor from the effort of delivering energy to the energy storing means during a peak load on the instrumentality actuated directly from the primary motor.

8. In a machine, the combination of two instrumentalities operating intermittently and successively; an internal combustion engine acting as a primary motor directly actuating one of said instrumentalities; a fluid actuated secondary motor actuating the other of said instrumentalities; a compressor driven by the primary motor and compressing fluid for actuating the secondary motor; and means for relieving the primary motor of the load of the compressor during the peak load on the instrumentality actuated directly from the primary motor.

9. In a power excavating machine, the combination of a digging implement; an internal combustion engine acting as a primary motor operating directly on said digging instrument; a secondary motor operating on said implement; energy storing means actuated by the primary motor and delivering energy to the secondary motor; and devices relieving the primary motor of the load of delivering energy to the energy storing means while delivering its peak load directly to the implement.

10. In a power excavating machine, the combination of a digging implement; an internal combustion engine acting as a primary motor operating directly on the implement; a fluid pressure actuated secondary motor acting on the implement; a compressor compressing fluid for actuating the secondary motor driven by the primary motor; and devices relieving the primary motor of the load of the compressor while delivering the peak load directly to the implement.

11. In a power excavating machine, the combination of a digging implement; a hoisting device for the implement; an internal combustion engine acting as a primary motor operating directly on the hoisting device; a secondary motor acting on the implement; an energy storing means supplied from the primary motor and supplying energy to the secondary motor; and means for relieving the primary motor of the load of supplying energy to the energy storing means while subjected to the peak load of the hoisting device.

12. In a power excavating machine, the combination of a digging implement; a hoisting device acting on the implement; an internal combustion engine acting as a primary motor driving the hoisting device; a secondary fluid pressure actuated motor acting on the implement; a compressor driven by the primary motor and supplying fluid for the secondary motor; and means for relieving the primary motor of the load of the compressor while subjected to the peak load of the hoisting device.

13. In a power excavating machine, the combination of a rotating platform; a fluid pressure actuated turning engine for the platform; a hoist; a non-fluid pressure actuated motor actuating the hoist; a compressor actuated by the non-fluid actuated motor compressing the fluid for the turning engine; and means for relieving the non-fluid pressure actuated motor of the load of the compressor while delivering its peak load to the hoist.

14. In a power excavating machine, the combination of a rotating platform; a fluid pressure actuated turning engine for the platform; a hoist; an internal combustion engine actuating the hoist; a compressor actuated by the internal combustion engine compressing fluid for the turning engine; and means relieving the internal combustion engine of the load of the compressor while delivering its peak load to the hoist.

15. In a power shovel, the combination of a dipper; a dipper stick; a fluid pressure actuated crowding engine acting on the dipper stick; a hoist; a non-fluid pressure actuated motor actuating the hoist; a compressor driven by the non-fluid pressure actuated motor; and means for relieving the non-fluid pressure actuated motor of the load of the compressor while delivering its peak load to the hoist.

16. In a power shovel, the combination of a dipper; a dipper stick; a fluid pressure actuated crowding engine acting on the dipper stick; a hoist; an internal combustion engine actuating the hoist; a compressor actuated by the internal combustion engine compressing fluid for the crowding engine; and means for relieving the internal combustion engine of the load of the compressor while delivering its peak load to the hoist.

17. In a power shovel, the combination of a dipper; a dipper stick; a fluid pressure actuated crowding engine actuating the dipper stick; a turning platform on which the dipper stick is mounted; a fluid pressure actuated turning engine turning the platform; a hoist; a non-fluid pressure actuated motor actuating the hoist; a compressor actuated by the motor compressing fluid for the crowding and turning engines; and means for relieving the motor of the load of the compressor while delivering the peak load to the hoist.

18. In a power shovel, the combination of a dipper; a dipper stick; a fluid pressure actuated crowding engine actuating the dipper stick; a turning platform on which the dipper stick is mounted; a fluid pressure actuated turning engine turning the platform; a hoist; an internal combustion engine actuating the hoist; a compressor actuated by the internal combustion engine compressing fluid for the crowding and turning engines; and means for relieving the internal combustion engine of the load of the compressor while delivering its peak load to the hoist.

19. In a power excavating machine, the combination of a digging implement; a primary motor acting directly on the digging implement through a variable speed transmission between the motor and implement; a secondary motor operating on the implement; an energy storing means receiving its energy from the primary motor and delivering the same to the secondary motor; and devices for relieving the primary motor of the load of delivering energy to the energy storing means while delivering its peak load directly to the digging implement.

20. In a power excavating machine, the combination of a non-fluid actuated motor; a digging implement; a direct connection between the motor and the digging implement; a traction gearing adapted to be directly connected with the motor; a variable speed transmission between the motor and the traction gearing; a fluid pressure actuated engine acting on the digging implement; and a compressor driven by the motor.

21. In a power excavating machine, the combination of a non-fluid actuated motor; a digging implement; a direct connection between the motor and the digging implement; a traction gearing adapted to be directly connected with the motor; a variable speed transmission between the motor and traction gearing; a fluid pressure actuated engine acting on the digging implement; a compressor driven by the motor; and devices for relieving the motor of the load of the compressor while delivering its peak load directly to the digging implement.

22. In a power excavating machine, the combination of a digging implement; an internal combustion engine acting as a primary motor and actuating the implement directly; a secondary motor operating on the implement; an energy storing means receiving its energy from the primary motor and delivering the same to the secondary motor; and devices responsive to variations in speed of the primary motor relieving the primary motor of the load of delivering energy to the energy storing means upon a decrease of speed of the primary motor.

23. In a power excavating machine, the combination of a digging implement; a primary motor actuating the implement directly; a secondary motor operating on the implement; an energy storing means receiving its energy from the primary motor and delivering the same to the secondary motor; and devices responsive to variations in speed of the primary motor relieving the primary motor of the load of delivering energy to the energy storing means upon a decrease of speed of the primary motor.

24. In a power excavating machine, the combination of a digging implement; an internal combustion engine acting as a primary motor directly on the implement; a secondary motor acting on the implement; energy storing means receiving its energy from the primary motor and delivering it to the secondary motor; a governor for the primary motor; and devices controlled by the governor relieving the primary motor of the load of delivering energy to the energy storing means upon a decrease of speed of the primary motor.

25. In a power excavating machine, the combination of a digging implement; an internal combustion engine acting as a primary motor directly upon the implement; a secondary motor acting upon the implement; energy storing means receiving its energy from the primary motor and delivering energy to the secondary motor; a governor for the primary motor; and devices actuated by the governor relieving the primary motor of the load of supplying energy to the energy storing means.

26. In a power excavating machine, the combination of a digging implement; an internal combustion engine acting directly upon the digging implement; fluid actuated engine operating upon the implement; a compressor operated by the internal combustion engine and delivering fluid to the fluid actuated engine; and devices responsive to the speed of the internal combustion engine relieving the internal combustion engine of the load of the compressor upon a decrease of speed of the internal combustion engine.

27. In a power excavating machine, the combination of a digging implement; an internal combustion engine acting directly upon the digging implement; a fluid actuated engine operating upon the implement; a compressor operated by the internal combustion engine and delivering fluid to the fluid actuated engine; a governor controlling the internal combustion engine; and devices actuated by the governor relieving the internal combustion engine of the load of the compressor upon a decrease of speed of the internal combustion engine.

28. In a power excavating machine, the combination of a digging implement; an internal combustion engine acting directly on the implement; a fluid actuated engine operating on the implement; a compressor actuated by the internal combustion engine delivering fluid to a receiver; a connection between the receiver and the fluid actuated engine; an unloader for the compressor; and means responsive to the speed of the internal combustion engine and the pressure of the receiver actuating the unloader.

29. In a power excavating machine, the combination of a digging implement; an internal combustion engine acting directly on the implement; a fluid actuated engine acting on the implement; a compressor; a receiver receiving fluid from the compressor; a connection between the receiver and the fluid actuated engine; an unloader for the compressor; a governor controlling the internal combustion engine; and means actuated by the governor responsive to the speed of the governor and the pressure of the receiver actuating the unloader.

30. In a power excavating device, the combination of a digging implement; an internal combustion engine directly actuating the implement; a fluid actuated engine actuating the implement; a receiver; a connection between the receiver and the fluid actuated engine; a compressor actuated by the internal combustion engine delivering to the receiver; an unloader for the compressor; fluid actuated means controlling the unloader; and devices responsive to the speed of the engine controlling said fluid actuated means.

31. In a power excavating device, the combination of a digging implement; an internal combustion engine directly actuating the implement; a fluid actuated engine actuating the implement; a receiver; a connection between the receiver and the fluid actuated engine; a compressor actuated by the internal combustion engine delivering to the receiver; an unloader for the compressor; fluid actuated means controlling the unloader; and devices responsive to the speed of the engine and the pressure of the receiver controlling said fluid actuated means.

32. The method of delivering intermittent and successive power impulses to instrumentalities which consists in directly exerting a power impulse from a primary motor, storing energy from the primary motor during intervals during which it is relieved from delivering a direct power impulse, and drawing from the stored energy to deliver impulses to the instrumentality through a secondary motor.

33. The method of actuating a power excavating machine which consists in delivering a power impulse to a digging implement of said machine directly from a primary motor, storing energy from the primary motor during intervals in which it is relieved from the load of exerting impulses directly to the digging implement, and delivering the energy so stored to the digging implement through a secondary motor.

34. The method of operating power excavating devices having a digging instrumentality which consists in directly delivering energy to the instrumentality from an internal explosive motor, storing energy from the motor while it is relieved from the load directly received from the instrumentality, and delivering the energy so stored to a second motor operating on the digging instrumentality.

35. The method of actuating power excavating machines having a digging instrumentality which consists in delivering energy to the instrumentality directly from a primary motor, compressing fluid by energy from the primary motor during intervals in which it is relieved of the peak load through its direct connection with the instrumentality, and operating the instrumentality through a fluid pressure actuated motor from the fluid compressed.

36. The method of actuating power excavating machines having a digging instrumentality which consists in delivering power directly to the instrumentality from an internal combustion engine, compressing fluid by energy from the engine at intervals when the engine is relieved of the peak load from the direct connection to the instrumentality, and operating the instrumentality by a fluid actuated motor actuated by the fluid compressed.

37. The method of actuating power excavating machines having a digging instrumentality which consists in delivering power directly to the instrumentality to hoist the same from a primary motor, storing energy from the primary motor during intervals in which the primary motor is relieved of the load of the hoist, and delivering the energy so stored to a turning motor swinging the digging instrumentality.

38. The method of actuating power excavating machines having a digging instrumentality which consists in delivering power directly to the instrumentality to hoist the same from a primary motor, storing energy from the primary motor during intervals in which the primary motor is relieved of the load of the hoist, and delivering the energy so stored to a crowding engine operating on the digging instrumentality.

39. The method of actuating power excavating machines having a digging instrumentality which consists in delivering power directly to the instrumentality to hoist the same from a primary motor, storing energy from the primary motor during intervals in which the primary motor is relieved of the load of the hoist, and delivering the energy so stored to a crowding and turning engine swinging and crowding the digging instrumentality.

40. The method of actuating power excavating machines having a digging instrumentality which consists in delivering power directly to the instrumentality to hoist the same from an internal combustion engine, storing energy from the internal combustion engine during intervals in which the internal combustion engine is relieved of the load of the hoist, and delivering the energy so stored to a turning motor swinging the digging instrumentality.

41. The method of actuating power excavating machines having a digging instrumentality which consists in delivering power directly to the instrumentality to hoist the same from an internal combustion engine, storing energy from the internal combustion engine during intervals in which the internal combustion engine is relieved of the load of the hoist, and delivering the energy so stored to a crowding engine operating on the digging instrumentality.

42. The method of actuating power excavating machines having a digging instrumentality which consists in delivering power directly to the instrumentality to hoist the same from an internal combustion engine, storing energy from the internal combustion engine during intervals in which the internal combustion engine is relieved of the load of the hoist, and delivering the energy so stored to a crowding and turning engine swinging and crowding the digging instrumentality.

In testimony whereof I have hereunto set my hand.

EDWIN J. ARMSTRONG.